(12) United States Patent
Yamamoto et al.

(10) Patent No.: US 7,367,303 B2
(45) Date of Patent: May 6, 2008

(54) CRANKSHAFT OF IN-LINE FOUR-CYLINDER ENGINE

(75) Inventors: Takeshi Yamamoto, Toyota (JP);
Takayuki Aoyama, Nagoya (JP);
Mizuho Inagaki, Toyoake (JP);
Nobuyuki Mori, Nagoya (JP);
Hirotoshi Yoshizaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/512,204

(22) Filed: Aug. 30, 2006

(65) Prior Publication Data

US 2007/0051197 A1    Mar. 8, 2007

(30) Foreign Application Priority Data

Sep. 2, 2005    (JP)    ............... 2005-255545

(51) Int. Cl.
*F02B 75/06* (2006.01)
*F16C 11/00* (2006.01)

(52) U.S. Cl. ................... 123/192.1; 74/603

(58) Field of Classification Search ............ 123/192.1, 123/192.2; 74/595, 603–604
See application file for complete search history.

(56) References Cited

U.S. PATENT DOCUMENTS

| | | | | |
|---|---|---|---|---|
| 1,661,341 A | * | 3/1928 | Oldson | 74/603 |
| 1,756,659 A | * | 4/1930 | Oldson | 74/603 |
| 3,538,788 A | * | 11/1970 | Patchen | 74/603 |
| 4,552,104 A | * | 11/1985 | Hara et al. | 123/192.1 |
| 4,730,512 A | * | 3/1988 | Ito et al. | 74/595 |
| 4,833,940 A | * | 5/1989 | Ito | 74/595 |
| 4,901,692 A | * | 2/1990 | Madden | 123/192.2 |
| 5,195,398 A | * | 3/1993 | Murrish et al. | 74/603 |
| 5,305,656 A | * | 4/1994 | Kamiya et al. | 74/604 |
| 5,481,942 A | * | 1/1996 | Baek | 74/603 |
| 5,758,551 A | * | 6/1998 | Ozeki | 74/603 |
| 5,875,753 A | * | 3/1999 | Ishikawa | 123/192.2 |
| 6,324,942 B1 | * | 12/2001 | Koike et al. | 74/603 |
| 6,626,139 B1 | * | 9/2003 | Horita et al. | 123/192.2 |
| 6,772,654 B1 | * | 8/2004 | Cobble | 74/595 |
| 7,234,432 B2 | * | 6/2007 | Nagira | 123/192.2 |

FOREIGN PATENT DOCUMENTS

| | | |
|---|---|---|
| JP | Y2-03-004850 | 2/1991 |
| JP | A-05-026297 | 2/1993 |
| JP | A-06-0193681 | 7/1994 |
| JP | A-07-071531 | 3/1995 |
| JP | A-08-121539 | 5/1996 |

\* cited by examiner

*Primary Examiner*—Hai Huynh
(74) *Attorney, Agent, or Firm*—Oliff & Berridge, PLC

(57) ABSTRACT

In a crankshaft of an in-line four-cylinder engine, an arm that is closest to a flywheel has a greater average thickness in a direction of the rotation axis of the crankshaft than those of other arms. Two of the arms that are coupled to both sides of the third journal from the flywheel each have a center of gravity closer to its own counterweight compared to the centers of gravity of the arms that face the two arms with corresponding crankpins in between. Accordingly, the rigidity against torsional deformation and the thickness of oil films on the journals are reliably maintained while suppressing increase in the weight of the entire crankshaft.

8 Claims, 3 Drawing Sheets

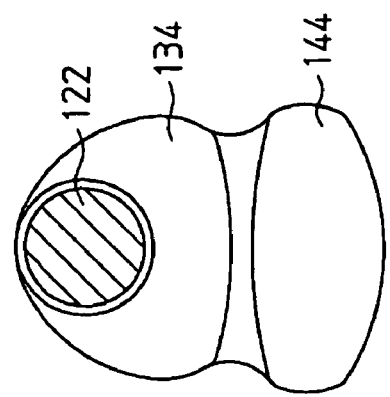
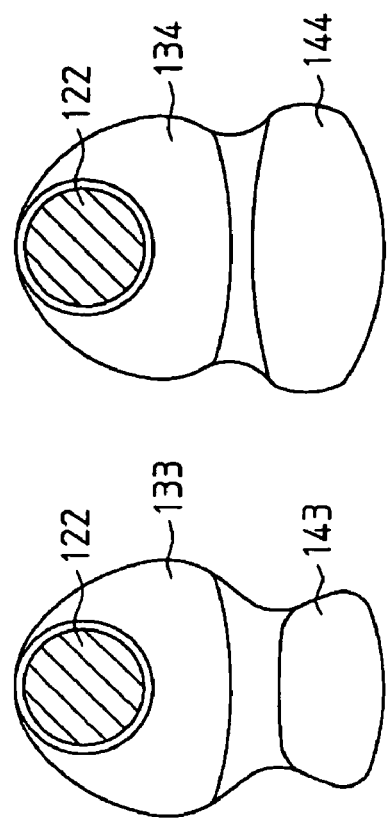
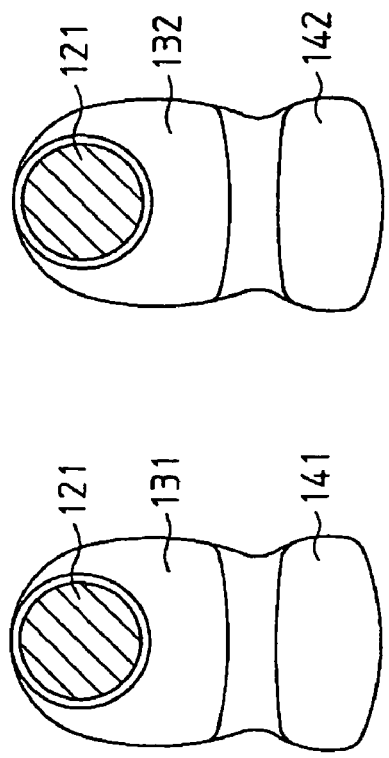
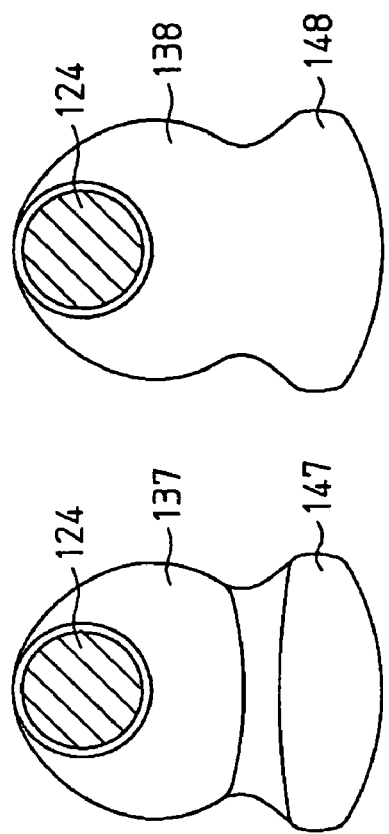
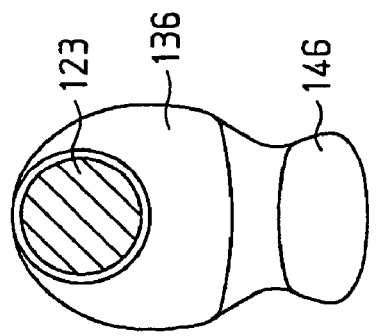
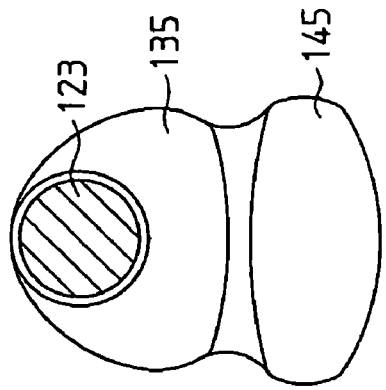

CRANKSHAFT OF IN-LINE FOUR-CYLINDER ENGINE

BACKGROUND OF THE INVENTION

The present invention relates to a crankshaft of an in-line four-cylinder engine.

In an internal combustion engine, a crankshaft and connecting rods convert linear movement of pistons into rotation. The crankshaft rotates at a high speed while receiving great load from the pistons through the connecting rods. Accordingly, the crankshaft is required to have a high rigidity. A crankshaft includes arms extending in radial directions in relation to the axis of a rotary shaft of the crankshaft, and crankpins that are coupled to the arms and eccentric from the rotation axis of the crankshaft. Such eccentric crankpins hinder smooth rotation of the crankshaft and produce vibration. To suppress such vibration, in the configuration disclosed in Japanese Laid-Open Patent Publication No. 5-26297, each arm has a counterweight in a section opposite to the part to which a crankpin is coupled, thereby keeping the balance of the entire crankshaft during rotation.

FIG. 3A is a front view illustrating the crankshaft of a typical in-line four-cylinder engine, and FIG. 3B is a cross-sectional view of the crankshaft.

As shown in FIGS. 3A and 3B, the crankshaft has five journals J1 to J5 supported by bearings provided in a cylinder block (not shown). The journals J1 to J5 are coupled to four crankpins P1 to P4 by arms A1 to A8, respectively. The crankpins P1 to P4 correspond to four cylinders, respectively. Counterweights W1 to W8 are provided at ends of the arms A1 to A8, respectively, to keep the balance of the crankshaft during rotation.

In the crankshaft shown in FIGS. 3A and 3B, the crankpins P2 and P3 of the four crankpins P1 to P4 are at the same rotational phase. Thus, the journal J3 between the crankpins P2 and P3 receives a particularly great eccentric load. This makes it difficult to maintain an oil film between the journal J3 and the corresponding bearing.

A flywheel for smoothing rotation (not shown) is attached to one end of the crankshaft in the axial direction. Therefore, torsional resonance having a node of vibration at a portion where the flywheel is provided is generated in the crankshaft. The torsional resonance causes the engine to vibrate. To suppress such torsional resonance, the thickness of the material may be increased in the entire crankshaft, thereby increasing the torsional rigidity. However, this configuration is unfavorable since the weight of the entire crankshaft would be increased.

As described above, the shape of a typical prior art crankshaft is not determined in consideration of the dynamic characteristics in the actual use. Particularly, phenomena caused by eccentric load such as local squeezing out of the oil film and the generation of torsional resonance are not taken into consideration. In this respect, prior art crankshafts have room for improvement.

SUMMARY OF THE INVENTION

Accordingly, it is an objective of the present invention to provide a crankshaft that reliably maintains the rigidity against torsional deformation and the thickness of oil films on journals, while suppressing increase in the weight of the entire crankshaft.

To achieve the above objective, and in accordance with one aspect of the present invention, a crankshaft of an in-line four-cylinder engine is provided. The engine is provided with a cylinder block having bearings. A flywheel is attached to one end of the crankshaft in the axial direction. The crankshaft has five journals each supported by one of the bearings of the cylinder block, four crankpins each corresponding to one of the cylinders of the engine, and eight arms alternately coupling the five journals and the four crankpins. Each arm is provided with a counterweight. The arm that is closest to the flywheel has a greater average thickness in a direction of the rotation axis of the crankshaft than those of the other arms. Two of the arms that are coupled to both sides of the third journal from the flywheel each have a center of gravity closer to its own counterweight compared to the centers of gravity of the arms that face the two arms with the corresponding crankpins in between.

In another aspect of the present invention, an engine having such a crankshaft is provided.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 2A to 2H are cross-sectional side views illustrating the arms of the crankshaft shown in FIG. 1;

DETAILED DESCRIPTION OF THE PREFERRED EMBODIMENTS

Figure 1:
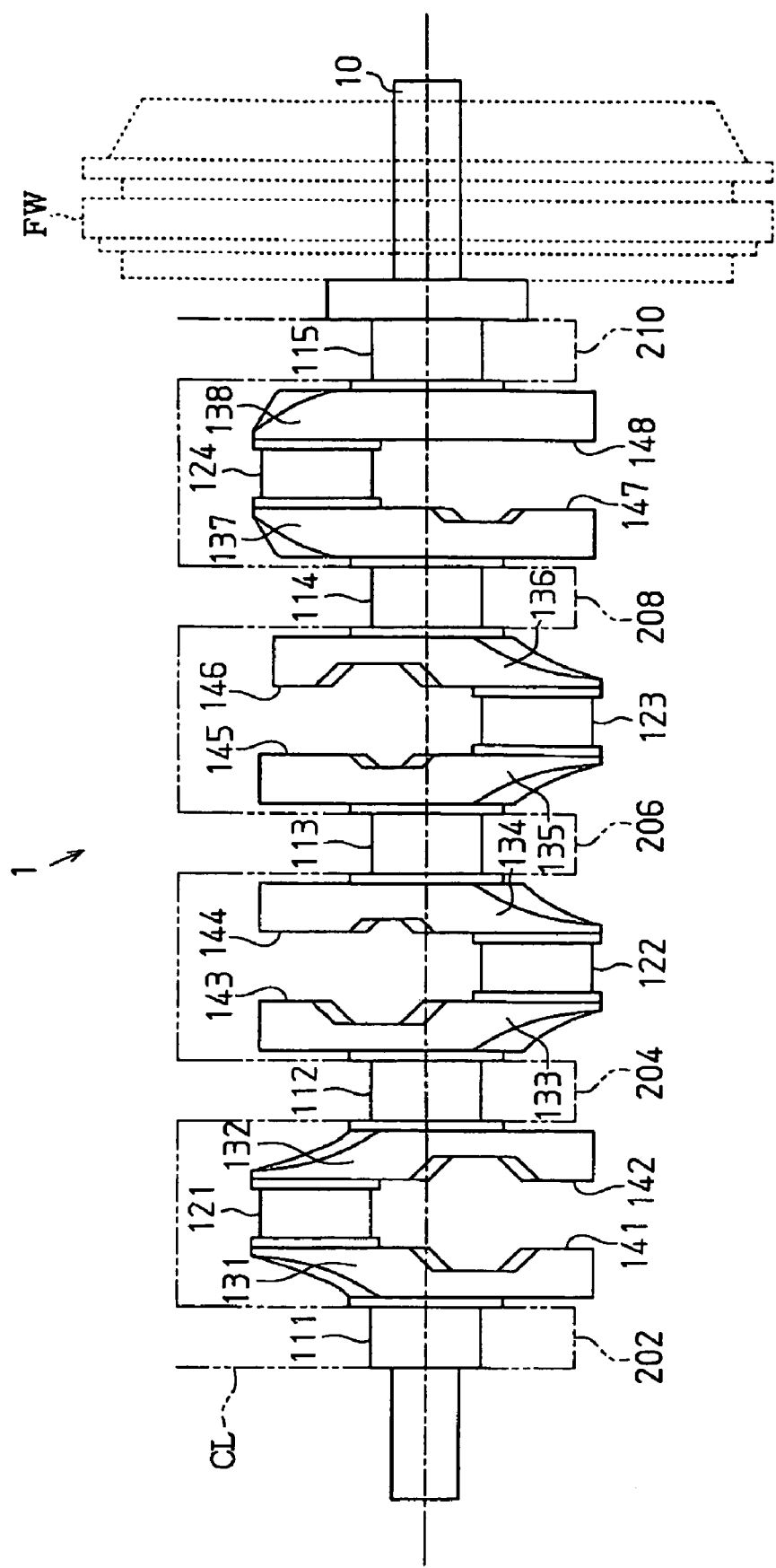
FIG. 1 is a front view illustrating a crankshaft of an in-line four-cylinder engine according to one embodiment of the present invention.
Figures 3A, 3B:
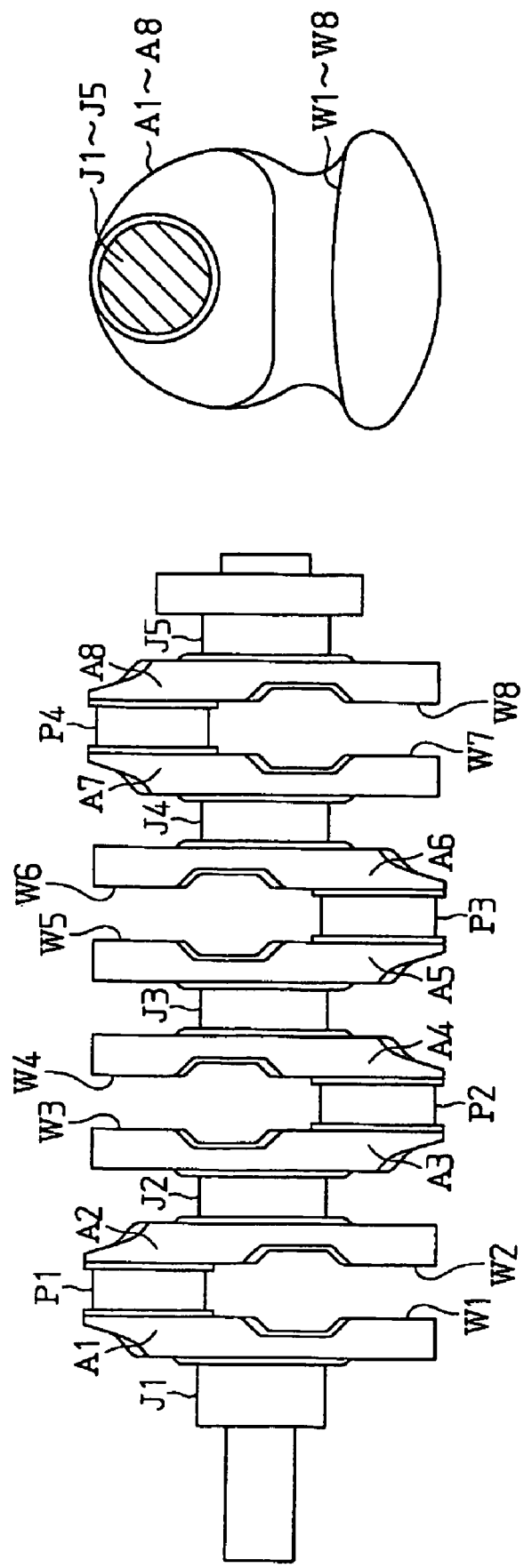
FIG. 3A is a front view illustrating a crankshaft of a typical in-line four-cylinder engine.
FIG. 3B is a cross-sectional side view illustrating an arm of the crankshaft shown in FIG. 3A.

The present invention will now be described with reference to FIGS. 1 to 2H. FIG. 1 is a front view illustrating a crankshaft 1 of an in-line four-cylinder engine according to one embodiment of the present invention. The crankshaft 1 includes five journals 111 to 115 rotatably supported by bearings 202, 204, 206, and 208 of a cylinder block CL, four crankpins 121 to 124 each corresponding to one of the engine cylinders (not shown), and eight arms 131 to 138 alternately coupling the journals 111 to 115 and the crankpins 121 to 124. The arms 131 to 138 extend in radial directions in relation to the rotation axis of the crankshaft 1, in other words, in relation to the axis of the journals 111 to 115. Each of the crankpins 121 to 124 is coupled to a pair of the arms 131 to 138 sandwiching the crankpin and is located at a position eccentric from the rotation center of the crankshaft 1. The arms 131 to 138 are provided with counterweights 141 to 148 located at ends opposite to the ends where the crankpins 121 to 124 are provided. A flywheel FW is attached to an axial end 10 of the crankshaft 1 in a state where the journals 111 to 115 are supported by bearings 202 to 208 of the cylinder block.

In this embodiment, the arms 131 to 138 of the crankshaft 1 all have different shapes corresponding to the respective positions. In this respect, the crankshaft 1 has a configuration different from that of a prior art crankshaft having arms of same shapes.

That is, when the average thicknesses t of the arms 131 to 138 in the direction of the rotation axis of the crankshaft 1 are represented by t8, t7, t6, t5, t4, t3, t2, and t1 in this order from the average thickness of the arm closest to the flywheel FW, the average thicknesses t1 to t8 satisfy the following relationship.

$$t8 > t7 > t5 = t4 > t6, t3, t2, t1$$

That is, the average thickness t8 of the arm 138, which receives a great torsional stress from the flywheel FW, is set to a relatively great value, while the average thicknesses t of the arms that receive little torsional stress are set to relatively small values.

FIGS. 2A to 2H each show the structure of a side of each of the arms 131 to 138 shown in FIG. 1. Two of the arms, or the arms 134 (FIG. 2D) and the arm 135 (FIG. 2E), are coupled to the sides of the third journal 113 from the flywheel FW. Compared to the arm 133 (FIG. 2C) and the arm 136 (FIG. 2F) that face the arms 134, 135 with the crankpins 122, 123 in between, the arms 134, 135 have heavier counterweights 144, 145. Thus, compared to the arms 133, 136 facing the arms 134, 135, the arms 134, 135 each have a center of gravity that is closer to its own counterweight.

The above embodiment provides the following advantages.

The average thicknesses t of the arms are set such that the average thickness of the arm 138, which is closest to the flywheel FW and thus receives a great torsional stress from the flywheel FW, is great, and that the average thicknesses of the arms that are farther from the flywheel FW and receive a relatively small torsional stress are small. That is, the thickness of the arm in which torsional deformation due to torsional stress is most likely to occur is set to a great value, thereby effectively suppressing such deformation, while the thicknesses of arms that receive small torsional stress are set to small values, thereby reducing the weight. As a result, the rigidity against torsional stress is maintained while suppressing increase in the weight of the entire crankshaft 1. Further, the centers of gravity of the arms 134, 135, which are coupled to the third journal 113, are each closer to its own counterweight compared to the centers of gravity of the arms 133, 136 facing the arms 134, 135. Therefore, even if the crankpins 122, 123 are at positions of the same rotational phase, eccentric load acting on the journal 113 during rotation of the crankshaft 1 is reduced. Thus, a favorable thickness of an oil film between the journal 113 and the corresponding bearing 206 is maintained. Accordingly, the rigidity against torsional deformation and the thickness of oil films on the journals are reliably maintained while suppressing increase in the weight of the entire crankshaft 1.

The preferred embodiment may be modified as follows.

As long as the average thickness t8 of the arm 138, which is closest to the flywheel FW, is greater than the average thicknesses t1 to t7 of the other arms, the expression t8>t7>t5=t4>t6, t3, t2, t1 does not need to be satisfied. That is, any other expression may be used to define the relationship of the average thicknesses t1 to t8 of the arms.

It may be configured that the weight of the counterweight 143 (146) is equal to the weight of the counterweight 144 (145), and that the thickness of the arm 134 (135) is made small in a portion close to the crankpin 122 (123), so that the center of gravity of the arm 134 (135) is closer to its own counterweight compared to that of the arm 133 (136).

Therefore, the present examples and embodiments are to be considered as illustrative and not restrictive and the invention is not to be limited to the details given herein, but may be modified within the scope and equivalence of the appended claims.

The invention claimed is:

1. A crankshaft of an in-line four-cylinder engine, the engine being provided with a cylinder block having bearings, wherein a flywheel is attached to one end of the crankshaft in an axial direction, the crankshaft comprising:
   five journals each supported by one of the bearings;
   four crankpins each corresponding to one of the cylinders of the engine; and
   eight arms alternately coupling the five journals and the four crankpins, each arm being provided with a counterweight, wherein the arm that is closest to the flywheel has a greater average thickness in a direction of the rotation axis of the crankshaft than those of the other arms, and wherein two of the arms that are coupled to both sides of the third journal from the flywheel each have a center of gravity closer to its own counterweight compared to the centers of gravity of the arms that face said two arms with the corresponding crankpins in between.

2. The crankshaft according to claim 1, wherein said two arms coupled to both sides of the third journal each have a heavier counterweight than the counterweights of the arms that face said two arms with the corresponding crankpins in between.

3. The crankshaft according to claim 1, wherein, when the average thicknesses of the arms in the direction of the rotation axis are represented by t8, t7, t6, t5, t4, t3, t2, and t1 in this order from the average thickness of the arm closest to the flywheel, the average thicknesses satisfy the following relationship:

$$t8 > t7 > t5 = t4 > t6, t3, t2, t1.$$

4. The crankshaft according to claim 1, wherein a first, a second, a third, and a fourth counterweight from the flywheel are positioned on the same side as an eighth, a seventh, a sixth and a fifth counterweight, respectively, with respect to the rotational axis of the crankshaft.

5. A crankshaft of an in-line four-cylinder engine, wherein a flywheel is attached to one end of the crankshaft in an axial direction, the crankshaft comprising:
   five journals supported by a cylinder block of the engine, the journals being located on a rotation axis of the crankshaft;
   four crankpins each corresponding to one of the cylinders of the engine, each crankpin being located at a position eccentric from the rotation axis of the crankshaft; and
   eight arms alternately coupling the five journals and the four crankpins along the direction of the rotation axis of the crankshaft, each arm being provided with two ends in a radial direction of the crankshaft, one of the end being coupled to the corresponding crankpin, the other end having a counterweight, wherein the arm that is closest to the flywheel has a greater average thickness in the direction of the rotation axis of the crankshaft than those of the other arms, and wherein two of the arms that are coupled to both sides of the third journal from the flywheel each have a center of gravity closer to its own counterweight compared to the centers of gravity of the arms that face said two arms with the corresponding crankpins in between.

6. An in-line four-cylinder engine comprising:
   a cylinder block having bearings;
   a flywheel; and a crankshaft, wherein the flywheel is attached to one of the crankshaft in an axial direction, the crankshaft including:
five journals each supported by one of the bearings of the cylinder block;
four crankpins each corresponding to one of the cylinders of the engine; and
eight arms alternately coupling the five journals and the four crankpins, each arm being provided with a counterweight, wherein the arm that is closest to the flywheel has a greater average thickness in a direction of the rotation axis of the crankshaft than those of the other arms, and wherein two of the arms that are coupled to both sides of the third journal from the flywheel each have a center of gravity closer to its own counterweight compared to the centers of gravity of the arms that face said two arms with the corresponding crankpins in between.

7. The engine according to claim 6, wherein said two arms coupled to both sides of the third journal each have a heavier counterweight than the counterweights of the arms that face said two arms with the corresponding crankpins in between.

8. The engine according to claim 6, wherein, when the average thicknesses of the arms in the direction of the rotation axis are represented by t8, t7, t6, t5, t4, t3, t2, and t1 in this order from the average thickness of the arm closest to the flywheel, the average thicknesses satisfy the following relationship:

$$t8>t7>t5=t4>t6, t3, t2, t1.$$

* * * * *